INVENTORS
JOSEPH C. HURLBURT
& JOHN K. HALE
BY Walter V. Wright
AGENT

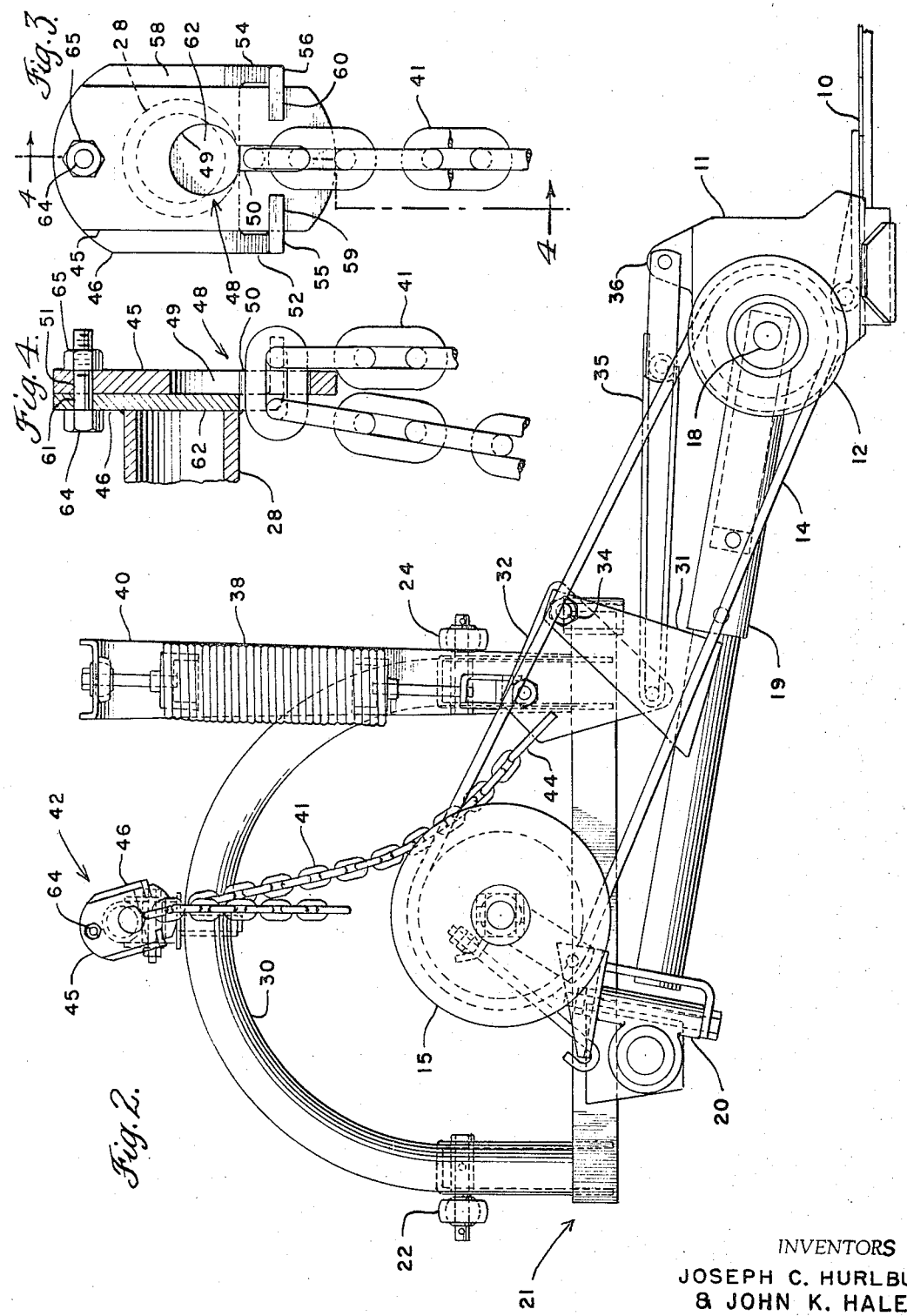

United States Patent Office 3,348,373
Patented Oct. 24, 1967

1

3,348,373
CHAIN CONNECTOR
Joseph C. Hurlburt, Leola, and John K. Hale, New Holland, Pa., assignors to Sperry Rand Corporation, New Holland, Pa., a corporation of Delaware
Filed Oct. 21, 1965, Ser. No. 499,582
2 Claims. (Cl. 59—93)

This invention relates to mechanism for yieldably interconnecting two structural members which are normally subject to force loads attemptting to drive the members apart.

In the field of agricultural machinery, for example, it is common to find combinations of mechanical elements wherein two relatively movable members must be fixed, or limited in their relative movement, during normal operation; but also be capable of moving apart, or separating, in response to overload, or emergency, conditions which generate forces of unusual magnitude capable of damaging the machinery. The function of such break-away connecting mechanisms in mechanical design applications is similar to the function of fuses in electrical design applications. The main objective of such mechanism is to prevent damage to expensive mechanical components when unusual conditions occur.

It is an object of this invention to provide break-away mechanism for yieldably interconnecting a pair of members wherein the mechanism readily enables adjustment of the relative connected positions of the members.

It is another object of this invention to provide break-away mechanism for yieldably interconnecting a pair of members wherein the load force to effect break-away is accurately predictable and controllable for a given application.

It is another object of this invention to provide mechanically simple, low-cost mechanism for yieldably interconnecting a pair of members in any of a great number of adjustable positions.

It is another object of this invention to provide simple effective break-away connecting mechanism capable of many varied applications in the field of agricultural machinery and other mechanical arts.

These and other objects and advantages of this invention will be apparent upon reference to the following description and claims taken in conjunction with the accompanying drawings wherein:

FIG. 2 is a fragmentary rear elevational view of the mower shown in FIG. 1;

FIG. 3 is an enlarged detail elevational view of a portion of the break-away connecting mechanism seen in FIGS. 1 and 2; and FIG. 4 is a sectional view taken on the line 4—4 of FIG. 3.

Figure 1:
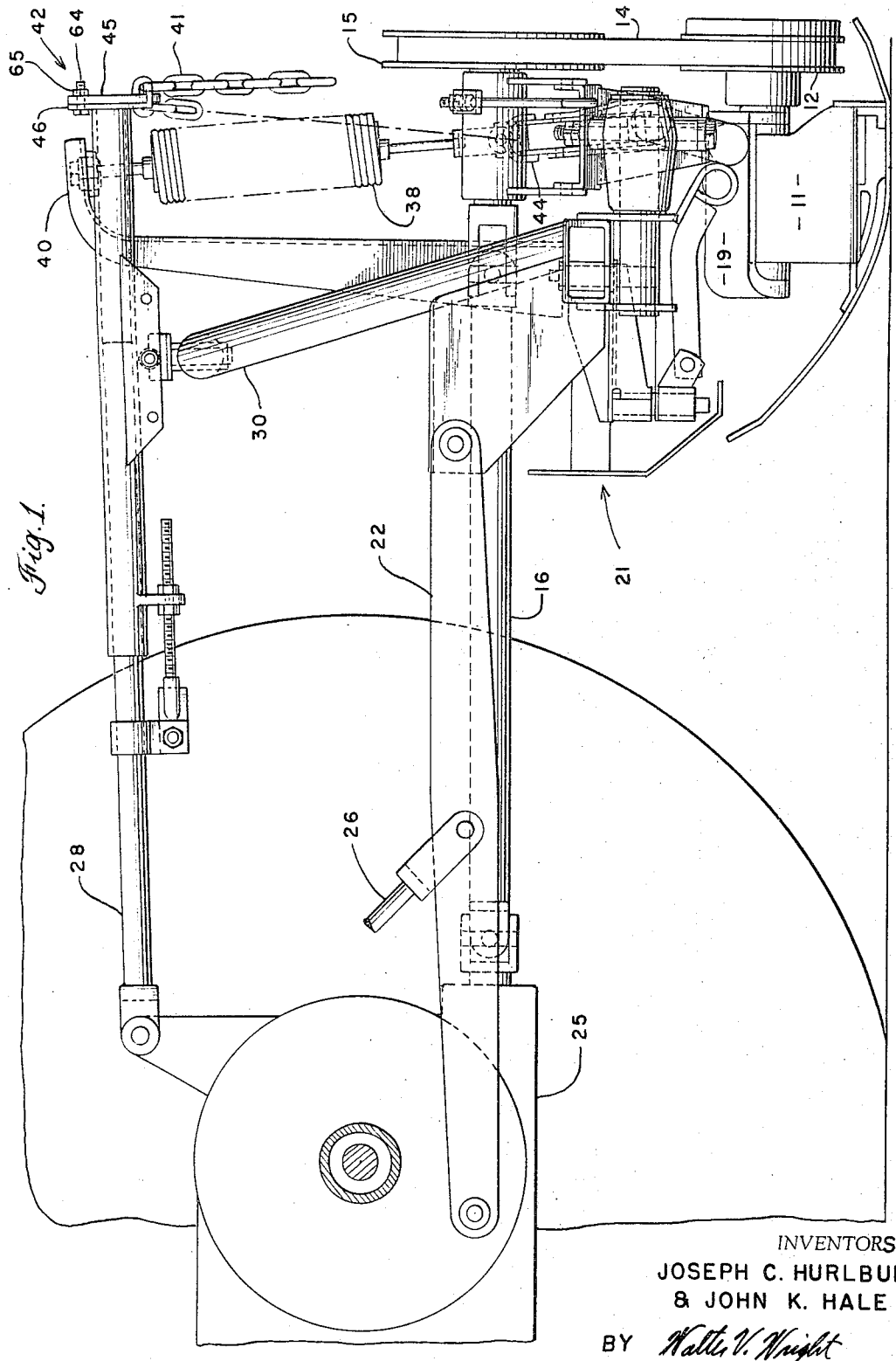
FIG. 1 is a fragmentary side elevational view of a tractor mounted mower illustrating an application of the break-away connecting mechanism of the present invention.

By way of illustrating one application of the present invention, FIGS. 1 and 2 of the drawings show a tractor mounted agricultural mower having the usual sickle bar 10 (FIG. 2) and a driving head 11. The driving head 11 is driven by a pulley 12 and V-belt 14. V-belt 14 is, in turn, driven by a pulley 15 which receives its driving power from the usual power-take-off shaft 16 (FIG. 1) extending rearwardly from the tractor on which the mower is mounted to the drive pulley 15. The shaft of pulley

2

12, which is indicated in FIG. 2 by the reference numeral 18, also serves to pivotally mount mower driving head 11 on the forked outer end of the usual drag bar 19. The end of drag bar 19 opposite the mower driving head 11 is carried by a special mounting assembly 20 (FIG. 2) which enables the drag bar 19 to pivot both horizontally and vertically relative to the main mower mounting frame 21, which carries the dual pivoting mounting assembly 20.

The mower mounting frame 21 is pivotally mounted on the rear ends of a pair of vertically swingable arms 22 and 24 which extend rearwardly from the respective sides of the main body 25 (FIG. 1) of a conventional farm tractor. The arms 22 and 24 may be selectively raised and lowered by the tractor operator by hydraulically actuated lift links 26 (one shown) as is well known in the tractor art. An upper stabilizer arm 28 has its forward end pivotally connected to the rear of the tractor body 25 and extends rearwardly therefrom to the center top portion of a U-shaped mast 30 which is a part of the mower mounting frame 21. Upper stabilizer arm 28 is connected to the top of mower mounting frame mast 30 to prevent fore-and-aft tipping of the mower mounting frame when the arms 22 and 24 are raised and lowered.

As is customary in 3-point hitch mower mounting arrangements of the type described above, the sickle bar 10 is pivotally movable about the axis of shaft 18 from the generally horizontal operative position shown in FIG. 2 to an upwardly inclined inoperative position. The drag bar 19 is also vertically pivotal relative to main frame 21 from the downwardly and laterally inclined operative position shown in FIG. 2 to a substantially horizontal raised transport position by virtue of the dual pivotal mounting assembly 20. As is customary in 3-point hitch mounted mowers, movement of the sickle bar 10 and drag bar 19 between their various positions occurs in response to raising and lowering of the main frame mounting arms 22 and 24.

Referring to FIG. 2, a stanchion 31 is fixedly carried by drag bar 19. A generally triangular plate 32 is pivotally carried by a bolt 34 on stanchion 31. The usual lost motion linkage 35 is interconnected between the lower corner of plate 32 and a lug 36 on the upper portion of mower driving head 11. A weight counterbalancing spring 38 is interconnected between a stanchion 40 on the main mower mounting frame and the upper corner of generally triangular plate 32. This spring normally counterbalances the weight of the drag bar mower assembly to enable it to float over the ground during a mowing operation.

The mechanism of the present invention is utilized between the rearmost end of stabilizer arm 28 and plate 32 to effect raising and lowering of the sickle bar 10 and drag bar 19 in response to the relative movement between the rear end of stabilizer arm 28 and lift arms 22 and 24 when the arms 22 and 24 are raised and lowered. The two major components of the present invention are the chain 41 and its special anchoring unit, indicated generally by the reference numeral 42.

The chain 41 is of the conventional link construction wherein each link is disposed in a plane substantially at right angles to the preceding and following links with which it interconnects. The one end of chain 41 is fixedly attached by a U-bolt, or the like, 44 to plate 32. Referring primarily to FIGS. 3 and 4, the chain anchoring device 42 comprises a first plate 45 and a second, or base, plate 46. First plate 45 has a keyhole shaped slot 48 formed therein. Keyhole slot 48 has a main body portion 49 which is of a size and shape to permit passage of the links of chain 41 therethrough. The keyhole slot 48 has a leg portion 50 extending from main body portion 49. The leg portion 50 is of a size and shape to receive one link of chain 41 therein while preventing passage of the perpendicularly oriented preceding and following links. First plate 45 is also provided with a bolt hole 51 spaced from keyhole slot 48. Plate 45 is preferably of rectangular configuration having first and second oppositely disposed large planar surfaces and relatively narrow edges extending transversely between the first and second planar surfaces. This will be apparent from FIGS. 3 and 4.

The base plate 46 is welded to the rear end of stabilizer arm 28 and provided at its lower end with lug members 52 and 54. The lugs 52 and 54 have first portions 55 and 56, respectively, which extend perpendicularly outwardly from the planar face surface 58 of the plate 46. The lugs 52 and 54 have second portions 59 and 60, respectively, which extend perpendicularly inward toward each other from portions 55 and 56. The base plate 46 is also provided with a bolt hole 61 near its top. The location of the lugs and bolt hole in plate 46 defines an operative position for first plate 45. The operative position of plate 45 is between the first portions 55 and 56 of the lugs 52 and 54, under the second portions 59 and 60 of lugs 52 and 54 and with bolt hole 51 in axial alignment with bolt hole 61. It will be apparent from FIGS. 3 and 4 that when first plate 45 is disposed in this operative position, a portion 62 of base plate 46 covers the main body portion 49 of keyhole slot 48 thereby preventing movement of chain 41 from leg portion 50 of the keyhole slot 48 into the main body portion 49 of the slot. This fixedly anchors chain 41 relative to base plate 46. A shear bolt 64 and nut 65 are employed to lock the plates 45 and 46 together. The shear bolt 64 is actually nothing more than a bolt designed to fail structurally when subjected to a predetermined force applied to the bolt as a direct shear load. Shear bolts of various sizes and strengths are commercially available.

In the application illustrated, the utility of the innerconnecting means of the present invention is as follows: Different models and makes of tractors are equipped with implement mounting arms as shown at 22 and 24, but the length and geometry of the arms and their mounting points vary from one tractor to the next. The extent of pivotal movement of the arms 22 and 24, under the control of the tractor hydraulic system, also varies from one tractor to the next. It is therefore necessary for the effective length of the drag bar lifting element (in this case chain 41) to be readily adjustable to accommodated different tractors on which the mower may be mounted. With the present invention, this is accomplished by placing the proper link of chain 41 in leg portion 50 of keyhole slot 48 in first plate 45 before bolting the plate 45 and 46 together. It is quite possible on some tractors for the mower mounting arms 22 and 24 to swing upwardly to an extent which would create binding in the pivotal joints and connecting linkage through which raising of the sickle bar and drag bar is accomplished. The power of the tractor hydraulic system is, under these conditions, often quite capable of deforming or breaking various elements of the mower mounting mechanism.

Elements of the mower mounting and lifting mechanism may also be damaged if the operator attempts to elevate the mower while the sickle bar is impaled on a root, stump, or the like. With the present invention, a shear bolt 64 is chosen which will fail before any harm can be done to the expensive parts of the mower. The lugs 52 and 54 on base plate 46 confine the first plate 45 so that it can move only perpendicular to the axis of shear bolt 64. This insures that forces attempting to separate the upper rear end of stabilizer arm 28 and plate 32 will be applied to shear bolt 64 as direct shear loads. In the absence of lugs 52 and 54, the first plate 45 could be pulled outwardly from base plate 46 thereby utilizing plate 45 as a pry-bar against bolt 64. This would result in unpredictable premature failure of the bolt. This particular application of the present invention is of special value when a given mower is used on different tractors. It affords ready adjustment of the mower mechanism to each tractor while affording protection for the mower mechanism in the event of the operator forgetting to make the necessary adjustment. The low cost construction and mechanical simplicity of the connecting means of this invention adapt it for use in many applications other than the specific one illustrated. In the field of agricultural machinery alone, there are many instances wherein a pair of members such as the stabilizer arm 28 and plate 32 must normally resist loads attempting to separate the members while desirably being able to separate under unusual conditions.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In combination with a pair of structural members subject to loads attempting to separate said members, break away mechanism for adjustably interconnecting said members to normally prevent separation thereof but to yield in response to separating loads in excess of a predetermined amount, said mechanism comprising a chain having a plurality of interconnected links wherein each link is disposed in a plane generally perpendicular to the plane of the preceding and following links with which it interconnects, means fixing one end of said chain to one of said pair of members, a first plate having a keyhole slot therein, said slot having a main body opening of a size to readily permit passage of said chain links therethrough and a leg portion extending from said main body opening, said leg portion being of a size to receive any selected one link of said chain therein and prevent passage therethrough of the perpendicularly disposed preceding and following chain links, said first plate having a bolt hole extending therethrough and spaced from said keyhole slot, a base plate fixedly carried by the other member of said pair of members, said base plate having a bolt hole therethrough, said first plate normally being positioned on said base plate in an operative position wherein said first plate bolt hole is aligned with said base plate bolt hole, said base plate having a portion covering said main body opening of said keyhole slot when said first plate is in operative position to prevent movement of a chain link from said leg portion of said keyhole slot into said main body portion thereby fixedly anchoring said chain relative to said first plate, a bolt having a predetermined shear strength normally extending through said aligned bolt holes when said first plate is in operative position, and means on said base plate engaging said first plate to prevent movement of said first plate relative to said base plate in all directions other than perpendicular to the axis of said bolt whereby forces attempting to separate said members are transferred between the members through said chain and said first plate and are applied to said bolt as direct shear loads.

2. The combination recited in claim 1 wherein said base plate has a planar surface, said first plate has side edges extending transversely between first and second oppositely disposed planar surfaces, said first planar surface of said first plate being in planar engagement with said planar surface of said base plate when said first plate is in said operative position, and wherein said means on said base plate engaging said first plate to prevent movement of said first plate relative to said base plate in all directions other than perpendicular to the axis of said bolt comprises lugs having first portions extending generally perpendicularly from said planar surface of said base plate and spaced apart a distance sufficient to receive said first plate therebetween, said first portions of said lugs lying respectively along said opposing side edges of said first plate when said first plate is in said operative position, said lugs having second portions extending perpendicularly from said first portions toward each other and overlying said second planar surface of said first plate when said first plate is in said operative position.

References Cited

UNITED STATES PATENTS

| | | | |
|---|---|---|---|
| 2,433,567 | 12/1947 | Lofgren | 59—93 |
| 3,282,045 | 11/1966 | Thelan | 59—93 |

FOREIGN PATENTS 61,972   6/1925   Sweden.

CHARLES W. LANHAM, *Primary Examiner.*